US008967604B2

(12) United States Patent
Fleischer

(10) Patent No.: US 8,967,604 B2
(45) Date of Patent: Mar. 3, 2015

(54) CENTERING AND CLAMPING DEVICE

(75) Inventor: Walter Fleischer, Frankfurt (DE)

(73) Assignee: Delaware Capital Formation, Inc., Wilmington, DE (US)

( * ) Notice: Subject to any disclaimer, the term of this patent is extended or adjusted under 35 U.S.C. 154(b) by 653 days.

(21) Appl. No.: 13/223,352

(22) Filed: Sep. 1, 2011

(65) Prior Publication Data

US 2012/0056384 A1 Mar. 8, 2012

(30) Foreign Application Priority Data

Sep. 3, 2010 (DE) ......................... 10 2010 044 327

(51) Int. Cl.

*F16J 15/16* (2006.01)
*B25B 5/06* (2006.01)
*B25B 5/08* (2006.01)
*B25B 5/12* (2006.01)

(52) U.S. Cl.

CPC ................. *B25B 5/062* (2013.01); *B25B 5/087* (2013.01); *B25B 5/12* (2013.01); *B25B 5/122* (2013.01)
USPC ................................ 269/32; 269/24; 269/228

(58) Field of Classification Search

CPC ........ B25B 5/062; B25B 5/064; B25B 5/087; B25B 5/12; B25B 5/122; B25B 5/127
USPC .................................... 269/2, 228, 24, 27, 32
See application file for complete search history.

(56) References Cited

U.S. PATENT DOCUMENTS 3,578,306 A * 5/1971 Smith ............................. 269/24
5,746,420 A * 5/1998 Kohlert ........................... 269/32
5,752,693 A * 5/1998 Brisco ............................. 269/24
6,105,947 A * 8/2000 Dykstra .......................... 269/24
6,976,671 B2 * 12/2005 Migliori .......................... 269/32
7,108,255 B2 * 9/2006 Zajac et al. ...................... 269/32
7,144,002 B2 * 12/2006 Zhao et al. ....................... 269/32
7,178,797 B2 * 2/2007 Migliori .......................... 269/32
7,188,832 B2 * 3/2007 Kita et al. ........................ 269/32
7,311,301 B2 * 12/2007 Liu et al. ......................... 269/32
7,669,840 B2 * 3/2010 Xu et al. .......................... 269/32
2004/0021260 A1 * 2/2004 Migliori .......................... 269/32
2004/0159996 A1 * 8/2004 Migliori .......................... 269/32
2005/0017424 A1 1/2005 Migliori

FOREIGN PATENT DOCUMENTS

DE 195 31 889 3/1997
DE 102 38 815 B3 2/2004
DE 10 2006 042 656 3/2008

(Continued)

*Primary Examiner* — Lee D Wilson

*Assistant Examiner* — Tyrone V Hall, Jr.

(74) *Attorney, Agent, or Firm* — Harness, Dickey & Pierce, P.L.C.

(57) ABSTRACT

A centering and clamping device has a housing (1) with a drive mechanism (2) situated in its interior for actuating a clamping hook (5). The clamping hook (5) is active outside the housing (1). The clamping hook (5) engages a seal element (3) that is positioned in an opening (4) on the housing (1). The seal element (3) has a passage opening (6) for receiving the clamping hook (5). The passage opening (6) fits exactly with the clamping hook (5) in every position. The seal element (3) is mounted so that it is rotatable in the opening (4) of the housing (1). A portion of the sealing element projects, at all times, outside of the housing (1) so that the opening (4) of the housing (1) is completely closed in every rotation position of the seal element (3).

9 Claims, 3 Drawing Sheets

(56) References Cited

FOREIGN PATENT DOCUMENTS

| | | | | |
|---|---|---|---|---|
| EP | 0 213 400 | | | 3/1987 |
| EP | 213400 | A2 | * | 3/1987 |
| EP | 0 937 538 | A1 | | 8/1999 |
| EP | 1 447 174 | | | 8/2004 |
| EP | 1624201 | A2 | * | 2/2006 |

* cited by examiner

CENTERING AND CLAMPING DEVICE

CROSS-REFERENCE TO RELATED APPLICATIONS

This application claims priority to German Application No. DE102010044327.1, filed Sep. 3, 2010. The disclosure of the above application is incorporated herein by reference.

FIELD

The disclosure relates to a centering and clamping device and, more particularly, to a centering and clamping device with a seal element.

BACKGROUND

A centering and clamping device is known according to DE 102 38 815 B3. It has a closed housing with a drive mechanism that actuates a clamping hook that is active outside the housing. The clamping hook engages through an opening on the housing provided with a seal element. The seal element is referred to as a "slot cover slide". It is implemented as a spring-loaded closure that follows the movement of the clamping hook. However, since the slot cover slide is only situated on one side of the clamping hook, in spite of the centering mandrel closed on one side, a danger exists that contaminants, such as metal chips or the like, will reach the interior of the housing.

SUMMARY

According to the disclosure, it is an object to improve a centering and clamping device of the type mentioned. In particular, it is an aspect to better protect the interior of the housing from contaminants than in the mentioned prior art.

The object is achieved by a centering and clamping device that comprises a housing with a drive mechanism coupled with the housing. A clamping hook, active outside the housing, is actuated by the drive mechanism. The hook mechanism engages a seal element positioned in an opening on the housing. The seal element includes a passage opening to receive the clamping hook. The passage opening fits exactly with the clamping hook in every position. The seal is mounted so that it is rotatable in the opening of the housing. The seal includes a portion that projects from the housing, at all times, such that the opening of the housing is completely closed in every rotational position of the seal element.

Thus, according to the disclosure, the seal element, that is provided with a passage opening for the clamping hook, fits exactly with the clamping hook in every position. The seal element is mounted so that it is rotatable in the opening of the housing. The seal element is implemented to completely close the opening of the housing in every rotational position. The seal element projects from the housing at all times to prevent contaminants from entering into the housing.

In other words, instead of the slot cover slide, a seal element is provided according to the disclosure. The seal is mounted so it is rotatable within the opening and in turn has a passage opening for the clamping hook. Thus, the fundamentally required mobility of the clamping hook in two spatial directions is therefore no longer achieved via the opening itself. Here, the clamping hook is guided so that it is axially displaceable in the seal element. Additionally, the seal element is mounted so that it is rotatable, itself, within the opening. Thus, the opening to be closed using the slot cover slide is eliminated. Furthermore, the respective seal is simplified by eliminating the movement guides. The clamping hook itself, as noted, is only guided so that it is axially displaceable in the passage opening. This ensures that the tightness is sufficient to ensure that the cross-section of the clamping hook corresponds to the cross-section of the passage opening on the entire travel range length. With respect to the rotatability of the seal element to the housing, for example, an approximately cylindrical formation of the seal element already results in the desired result, namely a secure seal of the opening of the housing. Additionally, with the seal projecting out of the housing at all times, containments are prevented from entering the interior of the housing.

Other advantageous refinements will become apparent to those skilled in the art.

The centering and clamping device, including the advantageous refinements, is explained in greater detail hereafter on the basis of the illustration in the drawings of a preferred exemplary embodiment.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
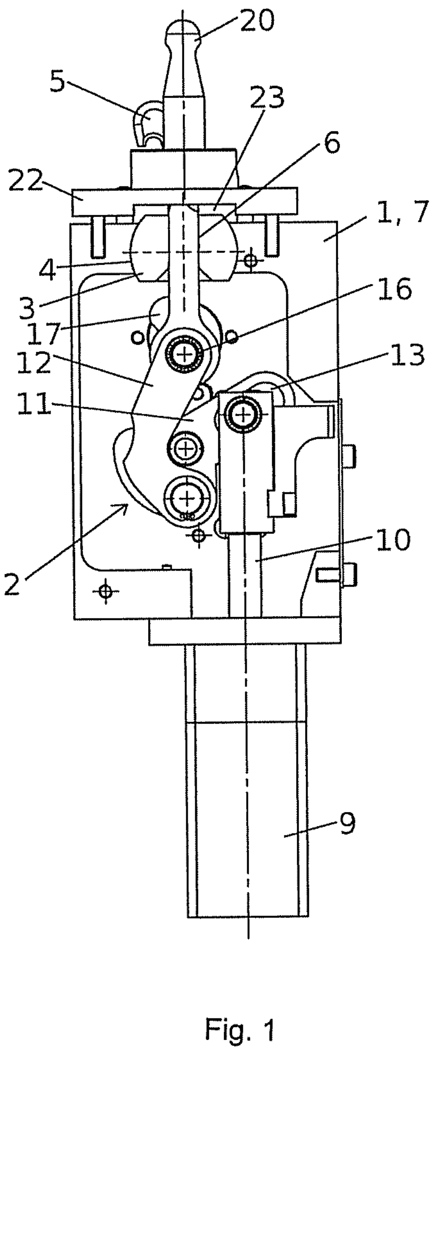
FIG. 1 is a side view of a centering and clamping device according to the disclosure in a clamping position (without workpiece) with a housing shell removed.

The device shown in FIGS. 1 to 5 includes a closed housing 1 with a drive mechanism 2 situated in its interior to actuate a clamping hook 5. The clamping hook 5 is active outside the housing 1 and engages through an opening 4 in the housing 1. The opening 4 is provided with a seal element 3.

A drive element 9 (a pneumatic cylinder here, however, a hydraulic cylinder or an electric drive may alternatively be considered) is situated on the end of the housing 1, facing away from the clamping hook 5. The drive mechanism 2 includes the drive element 9 (piston-cylinder unit), a two armed lever 11 and a drag element 12. The drive element 9 is situated outside the housing 1 with a linearly movable positioning rod 10 engaging in the housing 1. The two-armed lever 11 is mounted on the housing 1. The drag element 12 is articulated on one side with the clamping hook 5 and on the other side with the lever 11. The lever 11 and the positioning rod 10 are articulated with one another via a slotted guide 13. The lever 11 has two lever arms 14, 15 angled with respect to one another.

It is essential that the seal element 3, which is provided with a passage opening 6 for the clamping hook 5, fits exactly with the clamping hook 5 in every position. The seal element 3 is mounted so that it is rotatable in the opening 4 of the housing 1. The seal element 3 is implemented in the housing opening to completely close the housing opening 4 in every rotational position of the seal element 3. Additionally, the seal element 3 includes a portion that projects outside of the housing 1. The portion of the seal element is outside of the housing at all times through all the seal element's rotational positions. Thus, contaminants remain outside of the housing and are unable to enter into the interior of the housing 1 through the housing opening 4.

As explained at the beginning, this measure results in that no contaminants can reach the interior of the otherwise closed housing 1 via the opening 4 (which is only closable using a slot cover slide in the prior art).

Preferably, as shown, the seal element 3 has at least a partially cylindrical outer contour to implement its rotatability.

Figure 2:
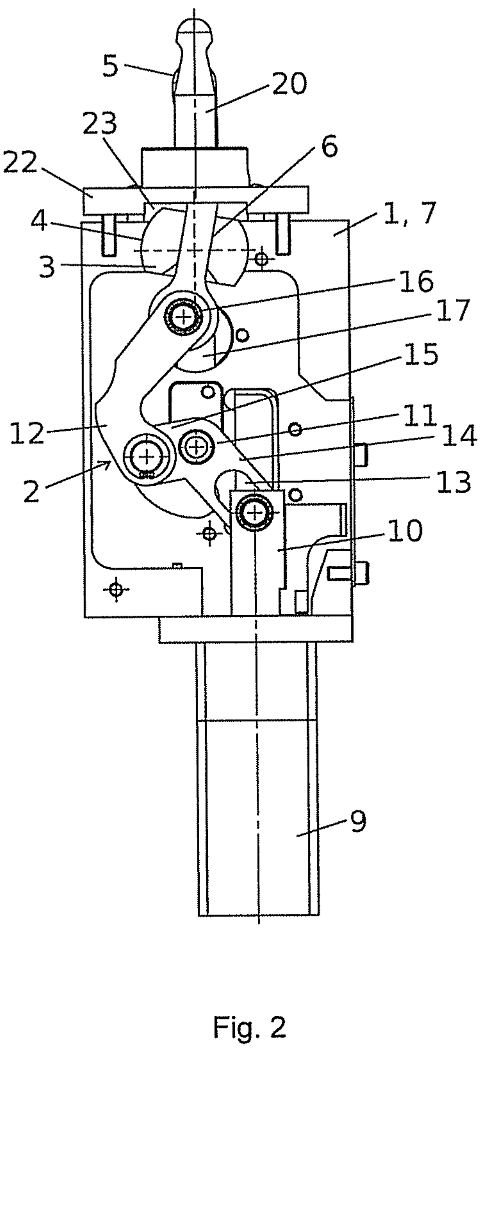
FIG. 2 is the same view of a centering and clamping device according to FIG. 1, in an open position.

In order that a gap does not result between the seal element 3 and the opening 4 during rotation, where contaminants such as chips or the like could collect, the seal element 3 is thicker when viewed in the axial displacement direction of the clamping hook 5 than a wall of the housing 1 in the area of the opening 4, even if the seal element 3 is implemented as flattened outside the housing 1, which is preferred and shown. Thus, this forms the portion of the sealing element 3 projecting outside the housing 1. FIG. 2 shows a rotational end position of the seal element 3 in an open position of the centering and clamping device. Here, in the right side of the drawing, an upper edge of the projecting seal portion still runs at least at the same height as the corresponding housing edge of the opening 4. Thus, a gap formation is avoided.

Figure 3:
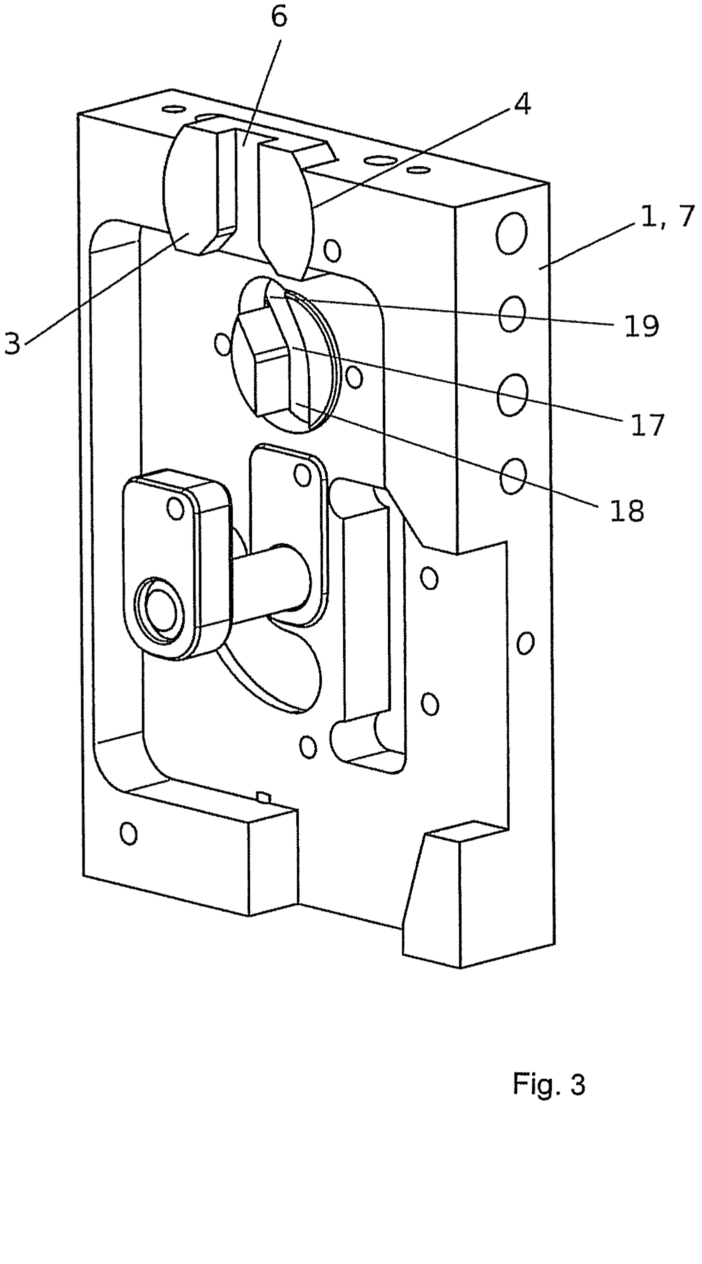
FIG. 3 is a perspective view of a housing shell of the centering and clamping device without a drive mechanism but with half of a seal element rotatable in the opening.
Figure 4:
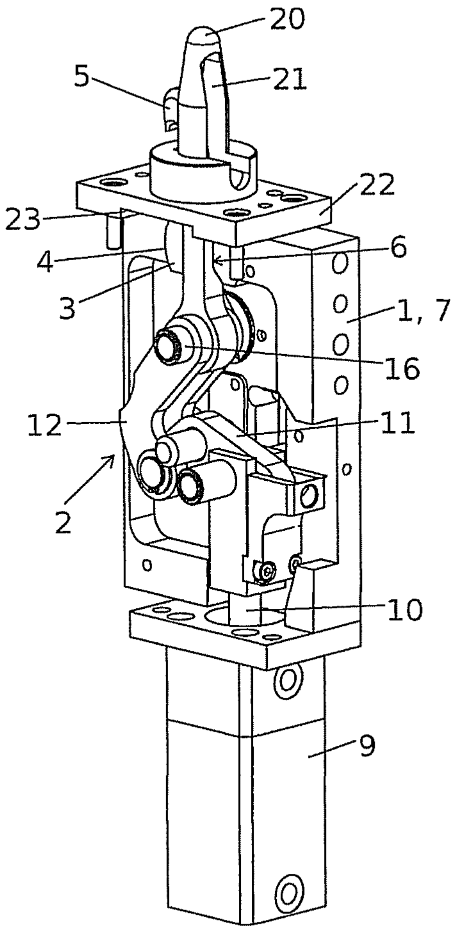
FIG. 4 is a perspective view of the centering and clamping device according to FIG. 1 with a housing shell removed.

In addition, with reference to FIG. 3, it is provided that the opening 4 is situated on a thickened wall area of the housing 1. Two opposing inner sides of the opening 4 are level and two other opposing inner sides of the opening 4 are in the form of a cylindrical section and adapted to the outer contour of the seal element 3. The opening 4 is preferably situated centrally in the area of a dividing plane of the housing 1. The housing 1 is preferably externally cuboid, formed from two half-shells 7, 8 that receive the drive mechanism 2 between them. Additionally, this is also true for the seal element 3. Preferably, the seal element 3 is composed of two parts to make installation easier, between which the passage opening 6 is situated.

The clamping hook 5 is guided so that it is axially displaceable in the passage opening 6. Thus, the passage opening 6 is in the form of a channel as shown in FIG. 3. This corresponds to a rectangular cross-section of the clamping hook 5. Alternatively, in the case of a corresponding rod-shaped clamping hook 5 (round cross-section), the seal would include a tubular bore. Both embodiments enable the clamping hook 5 to be exactly movably fit in the passage opening 6. However, the passage opening 6 may additionally include a seal (not shown separately), such as an O-ring seal in the case of a tubular implementation of the passage opening 6, for example.

As is obvious from FIG. 3, a part of the outer contour of the seal element 3 forms the mounting which ensures the rotatability within the opening 4. The (imaginary) rotational axis (see, FIGS. 1 and 2 in this regard) of the seal element 3 is always situated perpendicular to the channel or tube main axis of the passage opening 6.

Figure 5:
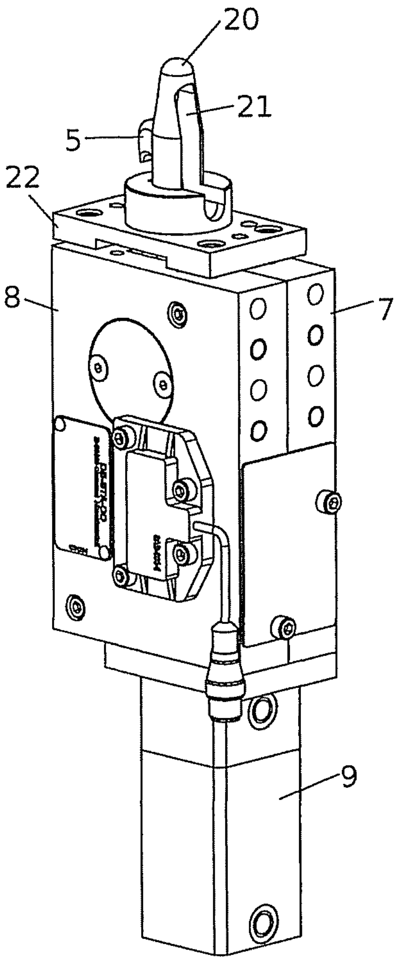
FIG. 5 is the same view of the centering and clamping device according to FIG. 4 with both housing shells.

In comparison to above-mentioned DE 102 38 815 B3, the solution according to the disclosure has a further special feature. This relates to the guiding of the clamping hook. In the above-mentioned prior art, the hook is guided, on the one hand, via a guide pin engaging in a curve provided on the clamping hook and, on the other hand, via a pin engaging in a (linear) line guide situated on the housing. In contrast, here a guide pin 16 is situated on the end of the clamping hook 5 in the housing interior. The guide pin 16 cooperates with a guide groove 17 provided on the housing 1. The guide groove 17 has two guide sections 18, 19 angled with respect to one another. The angles have the result that the rotational axis around which the clamping hook 5 rotates during clamping is mounted in the area of the seal element 3 rotatable in the opening 4. Also, as in the above-mentioned prior art, the guide groove 17 is implemented as a separate, specially hardened part (FIG. 5 shows how it is externally insertable).

A so-called centering mandrel 20 is situated externally on the housing 1 at the opening 4. The mandrel 20 has (see FIGS. 4 and 5) a receptacle area 21 for the clamping hook 5. The centering mandrel 20 is situated on an adapter plate 22. The adapter plate 22 is situated on the housing 1. The adapter plate 22 includes a recess 23 in the area of the seal element 3. The recess 23 is used as a movement space for the seal element 3 (see FIGS. 1 and 2).

The centering and clamping device functions as follows. The centering and clamping device is shown in the open position in FIG. 2. In this position, a component can be pushed or guided over the centering mandrel 20. The positioning rod 10 is pressed upward by actuating the drive element 9. This results in pivoting of the hooks (counterclockwise) by the slotted guide 13 of the lever 11 which, in turn, results in a downward movement of the drag element 12. Since the other end of the drag element 12 includes a guide pin 16 that is guided in the guide groove 17, a movement of the guide pin 16 or the lower end of the clamping hook 5 downward and to the right results. The clamping hook 5 is, in turn, mounted in the seal element 3 so that it is axially displaceable and rotatable to the housing 1. Thus, it follows that the other free end of the clamping hook 5, which is used for clamping, moves to the left out of the receptacle area 21 of the centering mandrel 20. This position is shown in FIG. 1.

The present disclosure has been described with reference to a preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A centering and clamping device comprising:

a housing having an opening for receiving a seal, the opening defined by an arcuate wall, a drive mechanism is coupled with the housing;

a clamping hook active outside the housing is actuated by the drive mechanism, the hook mechanism engages a seal element positioned in the opening on the housing;

the seal element includes a passage opening for receiving the clamping hook, the opening axially extending through the seal, the passage opening fits exactly with the clamping hook in every position, the seal is mounted so that it is rotatable in the opening of the housing, the seal includes a portion projecting from the housing at all times such that the opening of the housing is completely closed in every rotational position of the seal element and devoid of wiper seals on the seal element and the clamping hook extending from the seal with a peripheral configuration so that the clamping hook moving through the seal is axially continuous and in constant contact with the passage opening so that the passage opening is devoid of a seal contacting the clamping hook.

2. The centering and clamping device according to claim 1, wherein the seal element at least partially has a cylindrical outer contour.

3. The centering and clamping device according to claim 1, wherein the seal element is thicker, viewed in the axial displacement direction of the clamping hook, than a wall of the housing in the area of the opening.

4. The centering and clamping device according to claim 1, wherein the seal element has a flattened surface on the projecting portion.

5. The centering and clamping device according to claim 2, wherein the opening is situated on a thickened wall area of the housing, two opposing inner sides of the opening are level and two other opposing inner sides of the opening are in the form of a cylindrical section and adapted to the outer contour of the seal element.

6. The centering and clamping device according to claim 1, wherein the opening is situated in the area of a dividing plane of the housing.

7. The centering and clamping device according to claim 1, wherein the clamping hook is guided so it is axially displaceable in the passage opening.

8. The centering and clamping device according to claim 1, wherein the passage opening is implemented in the form of a channel or tube.

9. The centering and clamping device according to claim 8, wherein a rotational axis of the seal element is situated perpendicularly to the channel or tube main axis of the passage opening.

* * * * *